United States Patent
Zeng

(10) Patent No.: US 10,382,677 B2
(45) Date of Patent: Aug. 13, 2019

(54) METHOD AND SYSTEM FOR REMOTE CONTROL OF PHOTO-TAKING BY A BLUETOOTH SMART WATCH, A SMART TERMINAL AND SPP THEREOF

(71) Applicant: HUIZHOU TCL MOBILE COMMUNICATION CO., LTD., Hui Zhou (CN)

(72) Inventor: Peng Zeng, Hui Zhou (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 15/744,778

(22) PCT Filed: Dec. 2, 2016

(86) PCT No.: PCT/CN2016/108385
§ 371 (c)(1),
(2) Date: Jan. 13, 2018

(87) PCT Pub. No.: WO2017/211054
PCT Pub. Date: Dec. 14, 2017

(65) Prior Publication Data
US 2018/0205882 A1   Jul. 19, 2018

(30) Foreign Application Priority Data

Jun. 8, 2016   (CN) .......................... 2016 1 0400170

(51) Int. Cl.
*H04N 5/225*   (2006.01)
*H04N 5/232*   (2006.01)
(Continued)

(52) U.S. Cl.
CPC ...... *H04N 5/23232* (2013.01); *H04M 1/7253* (2013.01); *H04N 5/232* (2013.01);
(Continued)

(58) Field of Classification Search
None
See application file for complete search history.

(56) References Cited

U.S. PATENT DOCUMENTS

2011/0228110 A1*  9/2011  Thorson ............... G11B 27/034
                                                348/207.11
2014/0267742 A1*  9/2014  Tapia ..................... H04N 7/183
                                                348/157

FOREIGN PATENT DOCUMENTS

CN   105450268 A   3/2016
CN   105450848 A   3/2016
(Continued)

OTHER PUBLICATIONS

Bluetooth SIG, "Serial Port Profile" Specification, Jul. 24, 2012 (Year: 2012).*
(Continued)

*Primary Examiner* — Twyler L Haskins
*Assistant Examiner* — Dwight Alex C Tejano
(74) *Attorney, Agent, or Firm* — Shimokaji IP

(57) ABSTRACT

A method and system for remote control photography using a smart watch and smart terminal that communicate via a Serial Port Profile (SPP) protocol. The smart watch controls the smart terminal to capture a photograph that is then processed by the smart terminal to have a size and resolution compatible with a display of the smart watch.

8 Claims, 2 Drawing Sheets

(51) Int. Cl.
H04W 76/14 (2018.01)
H04M 1/725 (2006.01)
H04N 7/18 (2006.01)

(52) U.S. Cl.
CPC ........... H04N 5/23206 (2013.01); H04N 7/18 (2013.01); H04W 76/14 (2018.02); H04M 2250/02 (2013.01); H04M 2250/52 (2013.01); H04N 7/185 (2013.01)

(56) References Cited

FOREIGN PATENT DOCUMENTS

| | | |
|---|---|---|
| CN | 105915721 A | 8/2016 |
| CN | 106101403 A | 11/2016 |
| JP | 4295948 A | 4/2009 |

OTHER PUBLICATIONS

Bluetooth Technology Website, "Traditional Profile Specifications", accessed Jan. 7, 2019, https://www.bluetooth.com/specifications/profiles-overview (Year: 2019).*

International Search Report, PCT/CN2016/108385, dated Dec. 12, 2016.

* cited by examiner

METHOD AND SYSTEM FOR REMOTE CONTROL OF PHOTO-TAKING BY A BLUETOOTH SMART WATCH, A SMART TERMINAL AND SPP THEREOF

FIELD OF THE INVENTION

The present invention relates to the field of smart watch technologies, and in particular to a method and system for remote control of photo-taking by a Bluetooth smart watch, a smart terminal and a protocol, i.e. Serial Port Profile (SPP) thereof.

BACKGROUND

Along with the rapid development of Bluetooth smart accessories, there are more and more users who are using Bluetooth smart watches. Over recent years, in particular, Bluetooth smart watches possess more and more functions and work with terminal devices in an increasingly close manner.

At present, one has to seek help from others for taking a photo of oneself with a camera. Moreover, the biggest problem is that the photos cannot be viewed immediately after photo-taking, making it extremely inconvenient.

Therefore, the prior art needs to be further improved and developed.

SUMMARY

In view of the above deficiencies of the prior art, a method and system for remote control of photo-taking by a Bluetooth smart watch, a smart terminal and a protocol, i.e. Serial Port Profile (SPP) thereof, which is intended to address the problems of the prior art that one has to seek help from others for taking a photo of oneself with a camera, and the photos cannot be viewed immediately after photo-taking.

In an exemplary implementation, a method for remote control of photo-taking based on a Bluetooth smart watch SPP comprises: when a Bluetooth connection is established between the Bluetooth smart watch and a smart terminal having a camera through a SPP protocol, detecting whether the smart terminal receives a photo-taking instruction sent from the Bluetooth smart watch; when a photo-taking instruction is detected, taking an initial photo with the camera of the smart terminal; obtaining the watch display size of the Bluetooth smart watch; and reducing the initial photo at a corresponding ratio according to the watch display size of the Bluetooth smart watch, reducing the resolution to a designated resolution, and then sending the photo to the Bluetooth smart watch for display.

In an exemplary implementation, wherein the when a Bluetooth connection is established between the Bluetooth smart watch and a smart terminal having a camera through a SPP protocol, detecting whether the smart terminal receives a photo-taking instruction sent from the Bluetooth smart watch comprises: determining, when the Bluetooth module of the smart terminal is turned on, whether a name corresponding to the Bluetooth smart watch is found through search; when the name corresponding to the Bluetooth smart watch is found through search, performing SPP pairing with the Bluetooth smart watch according to the SPP protocol; and detecting, in real time, whether the photo-taking button of the Bluetooth smart watch is pressed, and when the pressing is detected, sending a photo-taking instruction to the smart terminal.

In an exemplary implementation, wherein after the when a photo-taking instruction is detected, taking an initial photo with the camera of the smart terminal further comprises: taking one or more initial photos with the camera, and when the photo-taking is completed, returning a prompt message to the Bluetooth smart watch for prompting that the photo-taking is successful.

In an exemplary implementation, wherein the reducing the initial photo at a corresponding ratio according to the watch display size of the Bluetooth smart watch, reducing the resolution to a designated resolution, and then sending the photo to the Bluetooth smart watch for display comprises: the smart terminal acquires a reduction ratio for original photos according to the size of said watch display and the size of the smart terminal display; determining whether there are multiple original photos; if there are multiple photos, combining the multiple initial photos into a picture in a dynamic format, reducing the picture in a dynamic format at the reduction ratio and reducing the resolution to a designated resolution, and then sending the resultant thumbnail to the Bluetooth smart watch for display; if it is not multiple original photos, reducing the single initial photo at the reduction ratio and reducing the resolution to a designated resolution, and then sending the resultant thumbnail to the Bluetooth smart watch for display.

In an exemplary implementation, wherein after the sending to the Bluetooth smart watch for display further comprises: when detecting a saving instruction, the Bluetooth smart watch saves the thumbnail.

In an exemplary implementation, wherein before the when a Bluetooth connection is established between the Bluetooth smart watch and a smart terminal having a camera through a SPP protocol, detecting whether the smart terminal receives a photo-taking instruction sent from the Bluetooth smart watch further comprises: developing an APP on the Bluetooth smart watch, so as to send a relevant instruction to connect with and control the smart terminal via the SPP protocol; and developing a customized supporting APP on the smart terminal for SPP pairing with the customized Bluetooth watch to monitor various control instructions sent from the Bluetooth smart watch end.

In an exemplary implementation, a system for remote control of photo-taking based on a Bluetooth smart watch SPP comprises: a detection module configured to detect, when a Bluetooth connection is established between the Bluetooth smart watch and a smart terminal having a camera through a SPP protocol, whether the Bluetooth smart watch sends a photo-taking instruction to the smart terminal; a photo-taking module configured to take, when a photo-taking instruction is detected, an initial photo with the camera of the smart terminal; a photo-adjusting module configured to reduce the initial photo at a corresponding ratio according to the watch display size of the Bluetooth smart watch, reduce the resolution to a designated resolution, and then send the photo to the Bluetooth smart watch for display.

In an exemplary implementation, the detection module specifically comprises: a searching unit configured to determine, when the Bluetooth module of the smart terminal is turned on, whether a name corresponding to the Bluetooth smart watch is found through search; a pairing unit configured to perform, when the name corresponding to the Bluetooth smart watch is found through search, SPP pairing with the Bluetooth smart watch according to the SPP protocol; an instruction sending unit configured for the Bluetooth smart watch to detect, in real time, whether the photo-taking button is pressed, and when the pressing is detected, send a photo-taking instruction to the smart terminal.

In an exemplary implementation, the photo-taking module takes one or more initial photos with the camera, and when the photo-taking is completed, returns a prompt message to the Bluetooth smart watch for prompting that the photo-taking is successful.

In an exemplary implementation, the photo-adjusting module specifically comprises: a size sending unit configured for the Bluetooth smart watch to send the size of the watch display to the smart terminal; a ratio calculating unit configured for the smart terminal to acquire a reduction ratio for original photos according to the size of said watch display and the size of the smart terminal display; a photo detecting unit configured to determine whether there are multiple original photos, and if yes, activate a first processing unit; if no, activate a second processing unit; the first processing unit configured to combine the multiple initial photos into a picture in a dynamic format, reduce the picture in a dynamic format at the reduction ratio and reduce the resolution to a designated resolution, and then send the resultant thumbnail to the Bluetooth smart watch for display; the second processing unit configured to reduce the single initial photo at the reduction ratio and reduce the resolution to a designated resolution, and then send the resultant thumbnail to the Bluetooth smart watch for display.

In an exemplary implementation, the system further comprises: a photo saving module configured for the Bluetooth smart watch to save, when detecting a saving instruction, the thumbnail.

In an exemplary implementation, the Bluetooth smart watch comprises a developed APP, so as to send a relevant instruction to connect with and control the smart terminal via the SPP protocol; and the smart terminal comprises a supporting APP for SPP pairing with the customized Bluetooth watch to monitor various control instructions sent from the Bluetooth smart watch end.

In an exemplary implementation, a smart terminal comprises: a camera; one or more processors; a memory, and one or more programs, wherein said one or more programs are stored in the memory and configured to be executed by said processors, and said one or more programs are configured to execute the following instructions: establishing a Bluetooth connection with the Bluetooth smart watch through a SPP protocol; detecting whether a photo-taking instruction sent from the Bluetooth smart watch is received; when a photo-taking instruction is detected, taking an initial photo with the camera; obtaining the watch display size of the Bluetooth smart watch; and reducing the initial photo at a corresponding ratio according to the watch display size of the Bluetooth smart watch, reducing the resolution to a designated resolution, and then sending the photo to the Bluetooth smart watch for display.

In an exemplary implementation, the establishing a Bluetooth connection with the Bluetooth smart watch through a SPP protocol specifically comprises: turning on the Bluetooth module of the smart terminal; determining whether a name corresponding to the Bluetooth smart watch is found through search; when the name corresponding to the Bluetooth smart watch is found through search, performing SPP pairing with the Bluetooth smart watch according to the SPP protocol.

In an exemplary implementation, after the when a photo-taking instruction is detected, taking an initial photo with the camera of the smart terminal further comprises: taking one or more initial photos with the camera, and when the photo-taking is completed, returning a prompt message to the Bluetooth smart watch for prompting that the photo-taking is successful.

In an exemplary implementation, the reducing the initial photo at a corresponding ratio according to the watch display size of the Bluetooth smart watch, reducing the resolution to a designated resolution, and then sending the photo to the Bluetooth smart watch for display comprises: the smart terminal acquires a reduction ratio for original photos according to the size of said watch display and the size of the smart terminal display; determining whether there are multiple original photos; if there are multiple photos, combining the multiple initial photos into a picture in a dynamic format, reducing the picture in a dynamic format at the reduction ratio and reducing the resolution to a designated resolution, and then sending the resultant thumbnail to the Bluetooth smart watch for display; if it is not multiple original photos, reducing the single initial photo at the reduction ratio and reducing the resolution to a designated resolution, and then sending the resultant thumbnail to the Bluetooth smart watch for display.

In an exemplary implementation, before the establishing a Bluetooth connection with the Bluetooth smart watch through a SPP protocol," the one or more programs are further configured to execute the following instructions: developing a customized supporting APP on the smart terminal for SPP pairing with the customized Bluetooth watch to monitor various control instructions sent from the Bluetooth smart watch end.

In an exemplary implementation, a Bluetooth smart watch comprises: a display; one or more processors; a memory, and one or more programs, wherein said one or more programs are stored in the memory and configured to be executed by said processors, and said one or more programs are configured to execute the following instructions: establishing a Bluetooth connection with the smart terminal having a camera through a SPP protocol; sending a photo-taking instruction to the smart terminal; sending the watch display size of the Bluetooth smart watch to the smart terminal; and receiving the thumbnail sent by the smart terminal for display, wherein the thumbnail is formed by reducing the initial photo at a corresponding ratio according to the watch display size of the Bluetooth smart watch, and reducing the resolution to a designated resolution.

In an exemplary implementation, the sending a photo-taking instruction to the smart terminal comprises: detecting, in real time, whether the photo-taking button of the Bluetooth smart watch is pressed; when the pressing is detected, sending a photo-taking instruction to the smart terminal.

In an exemplary implementation, after the receiving the thumbnail sent by the smart terminal for display the one or more programs are configured to execute the following instructions: when detecting a saving instruction, the Bluetooth smart watch saves the thumbnail.

The exemplary implementations provide a method and system for remote control of photo-taking by a Bluetooth smart watch, a smart terminal and SPP thereof, and the method comprises: when a Bluetooth connection is established between the Bluetooth smart watch and a smart terminal having a camera through a SPP protocol, detecting whether the Bluetooth smart watch sends a photo-taking instruction to the smart terminal; when a photo-taking instruction is detected, taking an initial photo with the camera of the smart terminal; reducing the initial photo at a corresponding ratio according to the watch display size of the Bluetooth smart watch, reducing the resolution to a designated resolution, and then sending the photo to the Bluetooth smart watch for display. With the present invention, a user takes a photo of himself/herself remotely using a smart terminal with no need to seek help from others and remotely controls the photo taking through a Bluetooth smart watch. Moreover, the thumbnail can be sent to the Bluetooth smart watch immediately after the photo taking for viewing, which makes it convenient for the user.

DETAILED DESCRIPTION

The exemplary implementations provide a method and system for remote control of photo-taking based on a Bluetooth smart watch protocol, i.e. Serial Port Profile (SPP). To make objects, technical solutions and effects of the exemplary implementations clearer and more specific, the exemplary implementations will be further described in detail below with reference to the accompanying drawings. It should be understood that the exemplary implementations s described herein are not limiting.

Figure 1:
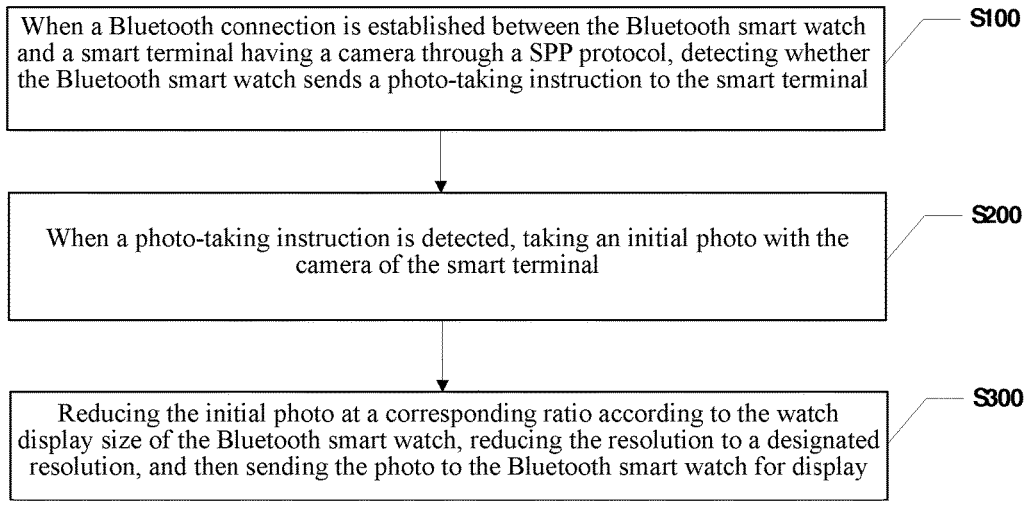
FIG. 1 is a flow chart showing an exemplary method for remote control of photo-taking based on a Bluetooth smart watch protocol, i.e. Serial Port Profile (SPP).

Please refer to FIG. 1, which is a flow chart of an exemplary implementation of the method for remote control of photo-taking based on a Bluetooth smart watch SPP. As shown in FIG. 1, the method for remote control of photo-taking based on a Bluetooth smart watch SPP comprises the following steps:

Step S100. When a Bluetooth connection is established between the Bluetooth smart watch and a smart terminal having a camera through a SPP protocol, detecting whether the Bluetooth smart watch sends a photo-taking instruction to the smart terminal.

In an exemplary implementation, when it is necessary to control a smart terminal having a camera to take photos through a Bluetooth smart watch (i.e. a smart watch having a Bluetooth module), a Bluetooth connection needs to be established first between the Bluetooth smart watch and the smart terminal having a camera through a Serial Port Profile (SPP) protocol. Since a transmission rate can be ensured within a certain distance after a Bluetooth connection is established between two devices through a SPP protocol, a Bluetooth connection is selected.

Step S200. When a photo-taking instruction is detected, taking an initial photo with the camera of the smart terminal.

When a photo-taking instruction is sent by touching and control of the display of the Bluetooth smart watch, the camera of the smart terminal is used to take an initial photo. In an exemplary implementation, there is a developed camera application (Camera App) on the Bluetooth smart watch. Then, the Bluetooth smart watch implements a whole set of SPP customization protocols, and the watch end Camera App can connect with and control the smart terminal by sending relevant instructions through the SPP protocol. Similarly, it is also necessary to customize and develop a supporting APP (AppManager) on the smart terminal for SPP pairing with the customized Bluetooth watch, and AppManager can monitor various control instructions sent from the Bluetooth smart watch end.

After the customized AppManager is installed on the smart terminal, enter AppManager, turn on Bluetooth, click Search, and when a name of the customized Bluetooth smart watch is found through search, click the name for SPP pairing. When pairing is completed, turn on the Camera APP on the Bluetooth smart watch. The watch end Camera APP will send an instruction to the paired smart terminal through the SPP protocol for turning on the watch end camera. Upon detecting the instruction to turn on the camera, AppManager on the smart terminal will perform the operation of turning on the camera, and similarly, upon detecting the photo-taking instruction, AppManager on the smart terminal will perform the photo-taking operation. In such a way, it is convenient for a user to remotely control a smart terminal through a Bluetooth smart watch.

Step S300. Reducing the initial photo at a corresponding ratio according to the watch display size of the Bluetooth smart watch, reducing the resolution to a designated resolution, and then sending the photo to the Bluetooth smart watch for display.

Since the watch display size of a Bluetooth smart watch is typically smaller than the display size of a smart terminal, photos taken by a camera of a smart terminal are usually automatically adjusted to photos adapted to the display size of a smart terminal. If the initial photos are sent to a Bluetooth smart watch without any processing, they would not be normally displayed on the display of the Bluetooth smart watch. At this moment, the initial photos may be reduced at a corresponding ratio according to the watch display size of the Bluetooth smart watch, the photo resolution is reduced to a designated resolution (e.g. reduced from 300 dpi to 96 dpi), and then the photos are sent to the Bluetooth smart watch for display. In such a way, the transmission rate is improved as the sizes of photo files to be transmitted are reduced.

Figure 2:
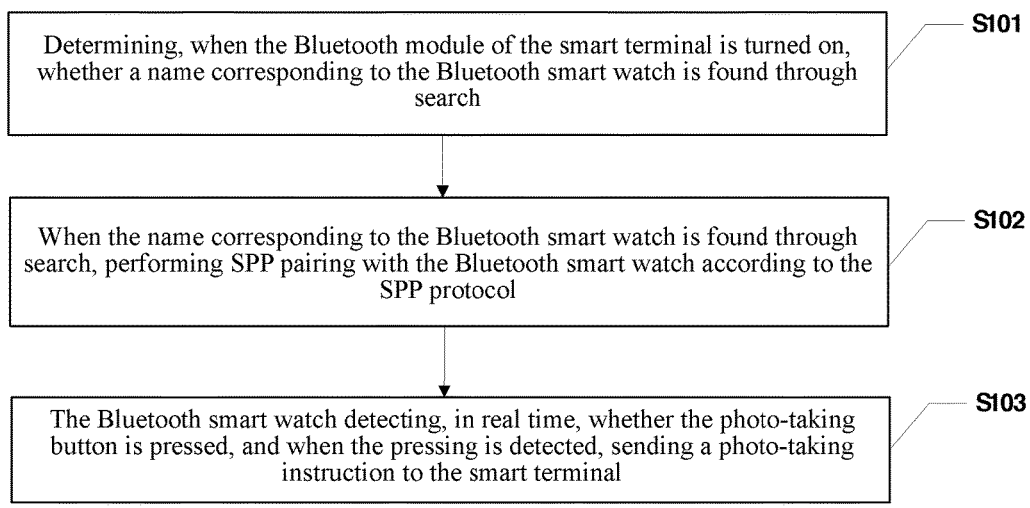
FIG. 2 is a flow chart showing an exemplary SPP pairing of a Bluetooth smart watch SPP.

As shown in FIG. 2, furthermore, the Step S100 in the method for remote control of photo-taking based on a Bluetooth smart watch SPP can include:

Step S101. Determining, when the Bluetooth module of the smart terminal is turned on, whether a name corresponding to the Bluetooth smart watch is found through a search;

Step S102. When the name corresponding to the Bluetooth smart watch is found through search, performing SPP pairing with the Bluetooth smart watch according to the SPP protocol;

Step S103. Detecting, in real time, whether the photo-taking button of the Bluetooth smart watch is pressed, and when the pressing is detected, sending a photo-taking instruction to the smart terminal.

Furthermore, in the Step S200 in the method for remote control of photo-taking based on a Bluetooth smart watch SPP, taking one or more initial photos with the camera, and when the photo-taking is completed, returning a prompt message to the Bluetooth smart watch for prompting that the photo-taking is successful.

Furthermore, the Step S300 in the method for remote control of photo-taking based on a Bluetooth smart watch SPP comprises:

Step S301 (not shown). The Bluetooth smart watch sends the watch display size to the smart terminal.

Step S302 (not shown). The smart terminal acquires a reduction ratio for original photos according to the size of said watch display and the size of the smart terminal display.

Specifically, the reduction ratio may be determined according to the ratio of the length of the watch display to the length of the smart terminal display; or the reduction ratio may be determined according to the ratio of the width of the watch display to the width of the smart terminal display.

Step S303 (not shown). Determining whether there are multiple original photos; if yes, go to the step S304 (not shown), otherwise go to the step S305 (not shown).

Step S304. Combining the multiple initial photos into a picture in a dynamic format, reducing the picture in a dynamic format at the reduction ratio and reducing the resolution to a designated resolution, and then sending the resultant thumbnail to the Bluetooth smart watch for display.

Step S305. Reducing the single initial photo at the reduction ratio and reducing the resolution to a designated resolution, and then sending the resultant thumbnail to the Bluetooth smart watch for display.

Furthermore, after the Step S300 in the method for remote control of photo-taking based on a Bluetooth smart watch SPP further comprises:

Step S400 (not shown). When detecting a saving instruction, the Bluetooth smart watch saves the thumbnail.

It can be seen that, with the exemplary implementations, a user takes a photo of himself/herself remotely using a smart terminal with no need to seek help from others and remotely controls the photo taking through a Bluetooth smart watch. Moreover, the thumbnail can be sent to the Bluetooth smart watch immediately after the photo taking for viewing, which makes it convenient for the user.

Figure 3:
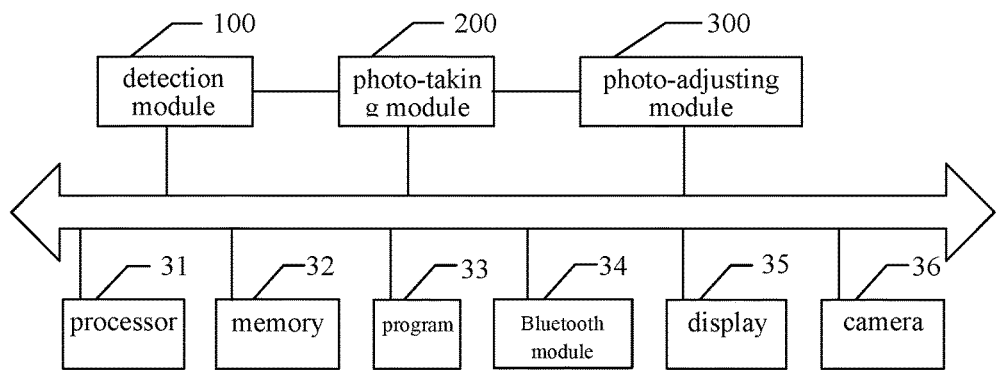
FIG. 3 is a structural block diagram of an exemplary system for remote control of photo-taking based on a Bluetooth smart watch SPP.

The exemplary implementations further provide a system for remote control of photo-taking based on a Bluetooth smart watch SPP. As shown in FIG. 3, the system for remote control of photo-taking based on a Bluetooth smart watch SPP can include:

a detection module 100 configured to detect, when a Bluetooth connection is established between the Bluetooth smart watch and a smart terminal having a camera through a SPP protocol, whether the Bluetooth smart watch sends a photo-taking instruction to the smart terminal;

a photo-taking module 200 configured to take, when a photo-taking instruction is detected, an initial photo with the camera of the smart terminal;

a photo-adjusting module 300 configured to reduce the initial photo at a corresponding ratio according to the watch display size of the Bluetooth smart watch, reduce the resolution to a designated resolution, and then send the photo to the Bluetooth smart watch for display.

Moreover, the system for remote control of photo-taking based on a Bluetooth smart watch SPP is applied in a smart terminal, and the smart terminal: a processor 31, a memory 32, a program 33, a Bluetooth module 34, a display 35, and a camera 36.

Figure 4:
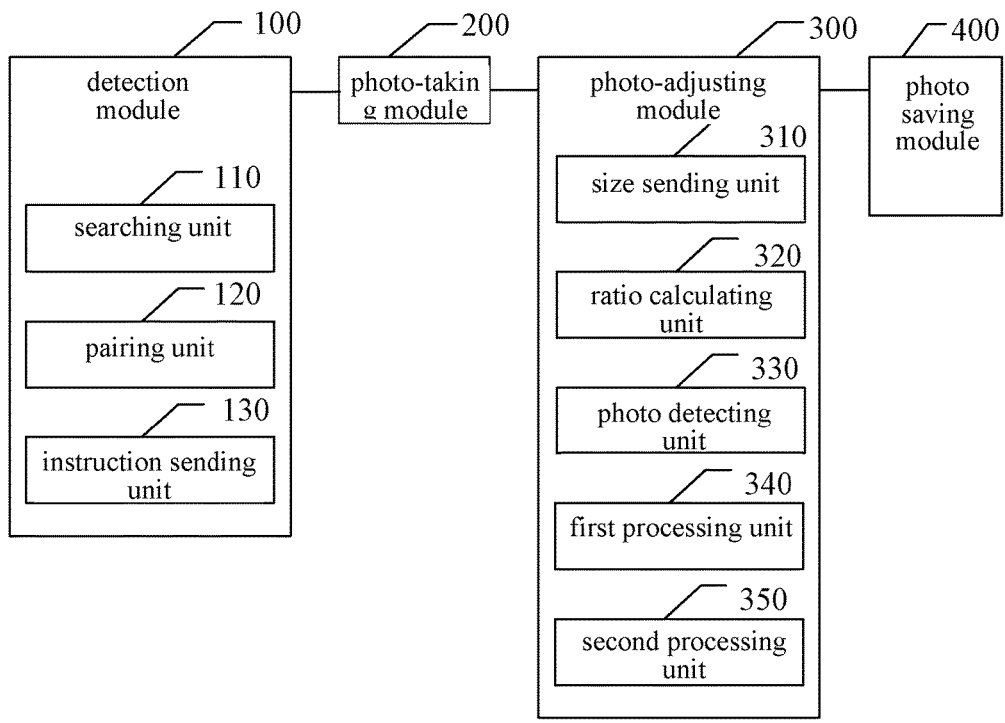
FIG. 4 is a structural block diagram of an exemplary system for remote control of photo-taking based on a Bluetooth smart watch SPP.

As shown in FIG. 4, furthermore, the detection module 100 in the system for remote control of photo-taking based on a Bluetooth smart watch SPP can include:

a searching unit 110 configured to determine, when the Bluetooth module of the smart terminal is turned on, whether a name corresponding to the Bluetooth smart watch is found through search;

a pairing unit 120 configured to perform, when the name corresponding to the Bluetooth smart watch is found through search, SPP pairing with the Bluetooth smart watch according to the SPP protocol;

an instruction sending unit 130 configured for the Bluetooth smart watch to detect, in real time, whether the photo-taking button is pressed, and when the pressing is detected, send a photo-taking instruction to the smart terminal.

Furthermore, the photo-taking module 200 in the system for remote control of photo-taking based on a Bluetooth smart watch SPP takes one or more initial photos with the camera, and when the photo-taking is completed, returns a prompt message to the Bluetooth smart watch for prompting that the photo-taking is successful.

Furthermore, the photo-adjusting module 300 in the system for remote control of photo-taking based on a Bluetooth smart watch SPP can include:

a size sending unit 310 configured for the Bluetooth smart watch to send the size of the watch display to the smart terminal;

a ratio calculating unit 320 configured for the smart terminal to acquire a reduction ratio for original photos according to the size of said watch display and the size of the smart terminal display;

a photo detecting unit 330 configured to determine whether there are multiple original photos, and if yes, activate a first processing unit; if no, activate a second processing unit;

the first processing unit 340 configured to combine the multiple initial photos into a picture in a dynamic format, reduce the picture in a dynamic format at the reduction ratio and reduce the resolution to a designated resolution, and then send the resultant thumbnail to the Bluetooth smart watch for display;

the second processing unit 350 configured to reduce the single initial photo at the reduction ratio and reduce the resolution to a designated resolution, and then send the resultant thumbnail to the Bluetooth smart watch for display.

Furthermore, the system for remote control of photo-taking based on a Bluetooth smart watch SPP can include:

a photo saving module 400 configured for the Bluetooth smart watch to save, when detecting a saving instruction, the thumbnail.

In summary, the exemplary implementations provide a method and system for remote control of photo-taking based on a Bluetooth smart watch SPP, and the method comprises: when a Bluetooth connection is established between the Bluetooth smart watch and a smart terminal having a camera through a SPP protocol, detecting whether the Bluetooth smart watch sends a photo-taking instruction to the smart terminal; when a photo-taking instruction is detected, taking an initial photo with the camera of the smart terminal; reducing the initial photo at a corresponding ratio according to the watch display size of the Bluetooth smart watch, reducing the resolution to a designated resolution, and then sending the photo to the Bluetooth smart watch for display.

Thus, a user takes a photo of himself/herself remotely using a smart terminal with no need to seek help from others and remotely controls the photo taking through a Bluetooth smart watch. Moreover, the thumbnail can be sent to the Bluetooth smart watch immediately after the photo taking for viewing, which makes it convenient for the user.

It should be understood that those skilled in the art can make equivalent substitutions or changes according to the technical solutions and concepts of the present invention, while all these substitutions or changes shall be encompassed by the appended claims.

The invention claimed is:

1. A method for remote control photography using a smart watch, the method comprising:

establishing connection between the smart watch and a smart terminal having a camera via a Serial Port Profile (SPP) protocol;

receiving, via the smart terminal, an instruction to take a photo from the smart watch;

taking, via the smart terminal, one or more initial photos using the camera of the smart terminal in response to the instruction;

identifying, via the smart terminal, a display size of the smart watch; and reducing, via the smart terminal, a resolution of the one or more initial photos to a designated resolution, reducing, via the smart terminal, a size of the one or more initial photos using a reduction ratio based on a ratio of a size of a display of the smart watch to a size of a display of the smart terminal to produce a reduced photo; and sending the reduced photo to the smart watch for display;

wherein the reducing a size and resolution of the initial one or more photos further comprises:

determining, via the smart terminal whether the one or more initial photos include multiple initial photos, wherein if there are multiple initial photos, the method further comprises:

combining the multiple initial photos into a combined photo in a dynamic format; and reducing a resolution of the combined photo to the designated resolution and reducing a size of the combined photo using the reduction ratio to produce the reduced photo that is sent to the smart watch for display.

2. The method according to claim 1, wherein the establishing a connection between the smart watch and the smart terminal comprises:

identifying, via the smart terminal, the smart watch based on a name of the smart watch;

pairing the identified smart watch and the smart terminal using the SPP protocol; and receiving, via the smart terminal, the instruction to take a photo from the smart watch, wherein the instruction is generated based on the smart watch detecting, in real-time, a pressing of the photo-taking button.

3. The method according to claim 1, further comprising:
sending, via the smart terminal, a message to the smart watch indicating that the one or more initial photos have been successfully taken.

4. The method according to claim 1, further comprising:
saving, via the smart watch, the reduced photo based on a saving instruction.

5. A system for remote control photography using a smart watch, the system, comprising:

a smart terminal configured to:
establish a Bluetooth connection between the smart watch and the smart terminal via a Serial Port Profile (SPP) protocol;

receive a photo-taking instruction from the smart watch;

take one or more initial photos when the photo-taking instruction is received;

adjust a resolution of the one or more initial photos to a designated resolution, reduce a size of the one or more initial photos using a reduction ratio based on a ratio of a size of a display of the smart watch to a size of a display of the smart terminal to produce a reduced photo;

send the reduced photo to the smart watch for display;

wherein the smart terminal is further configured to:
receive, from the smart watch, information identifying a size of a display of the smart watch;

calculate the reduction ratio based on a ratio of the size of the display of the smart watch to a size of the display of the smart terminal;

determine whether the one or more initial photos include multiple initial photos, wherein if there are multiple initial photos, then the smart terminal is further configured to:

combine the multiple initial photos into a combined photo in a dynamic format; and reduce a size of the combined photo using the reduction ratio and reduce a resolution of the combined photo to a designated resolution to produce the reduced photo that is sent to the smart watch for display.

6. The system according to claim 5, wherein the smart terminal is further configured to:

identify the smart watch based on a name search of the smart watch;

pair with the identified smart watch using the SPP protocol;

receive in real-time a photo-taking instruction from the smart watch generated based on the pressing of a photo-taking button of smart watch.

7. The system according to claim 5, wherein the smart terminal is further configured to:

send a message to the smart watch indicating that the one or more initial photos have been successfully.

8. The system according to claim 5, wherein the smart watch is configured to:

save the reduced photo based on a saving instruction.

* * * * *